US008856287B2

(12) United States Patent
Gregoire et al.

(10) Patent No.: US 8,856,287 B2
(45) Date of Patent: Oct. 7, 2014

(54) SERVICE PERSONALIZATION IN A TERMINAL DEVICE

(75) Inventors: Louis Gregoire, Cassis (FR);
Anne-Marie Praden, Ventabren (FR)

(73) Assignee: Gemalto SA, Meudon (FR)

( * ) Notice: Subject to any disclaimer, the term of this patent is extended or adjusted under 35 U.S.C. 154(b) by 1148 days.

(21) Appl. No.: 11/795,127

(22) PCT Filed: Dec. 20, 2005

(86) PCT No.: PCT/EP2005/056977
§ 371 (c)(1),
(2), (4) Date: Jul. 12, 2007

(87) PCT Pub. No.: WO2003/074854
PCT Pub. Date: Jul. 20, 2006

(65) Prior Publication Data
US 2009/0006584 A1    Jan. 1, 2009

(30) Foreign Application Priority Data
Jan. 13, 2005  (FR) .................................... 05 00356

(51) Int. Cl.
*G06F 15/177*  (2006.01)
*G06F 17/30*  (2006.01)
*H04L 29/06*  (2006.01)
*H04L 29/08*  (2006.01)
*H04M 3/42*  (2006.01)
*H04N 21/2668*  (2011.01)

(52) U.S. Cl.
CPC ........ *G06F 15/177* (2013.01); *G06F 17/30867* (2013.01); *G06F 17/30029* (2013.01); *H04L 29/06* (2013.01); *H04L 29/08072* (2013.01); *H04M 3/42272* (2013.01); *H04N 21/2668* (2013.01)
USPC ........................................................ 709/220

(58) Field of Classification Search
CPC .. G06F 15/177; H04L 29/06; H04M 3/42272; H04N 21/2668
USPC .......................................................... 709/220
See application file for complete search history.

(56) References Cited

U.S. PATENT DOCUMENTS 5,857,187 A *  1/1999  Uenoyama et al. ................... 1/1
5,864,823 A    1/1999  Levitan
(Continued)

FOREIGN PATENT DOCUMENTS

| JP | 2002-142159 A | 5/2002 |
| WO | WO 00/62547 A | 10/2000 |
| WO | 01/15036 A2 | 3/2001 |

OTHER PUBLICATIONS

Nocker et al., "ULE versus MPE as an IP over DVB Encapsulation", 2004.*

(Continued)

*Primary Examiner* — Ondrej Vostal
(74) *Attorney, Agent, or Firm* — Buchanan Ingersoll & Rooney PC

(57) ABSTRACT

Two service signals are transmitted from a service server through a first network in such a way that users' terminal devices display personalized service data items. When service signals are filtered, a terminal device extracts common data items accessible for several terminal devices and a parameter type from a service signal identified by a stored identifier. An end address is determined by applying a stored parameter, related to the parameter type, to a pre-recorded or transmitted algorithm. The end address is transmitted, through a second network, to a server which transmits a first personalized file associated with the end address and bearing personalized data items displayed with the common data items in the device.

11 Claims, 6 Drawing Sheets

(56) References Cited

U.S. PATENT DOCUMENTS

| | | | |
|---|---|---|---|
| 6,542,504 B1* | 4/2003 | Mahler et al. | 370/392 |
| 6,748,219 B2* | 6/2004 | Jokinen | 455/446 |
| 6,914,897 B1* | 7/2005 | Schuster et al. | 370/352 |
| 7,325,043 B1* | 1/2008 | Rosenberg et al. | 709/219 |
| 7,370,004 B1* | 5/2008 | Patel et al. | 705/14.37 |
| 7,379,997 B2* | 5/2008 | Ehlers et al. | 709/224 |
| 7,464,386 B2* | 12/2008 | Millington et al. | 719/331 |
| 7,496,527 B2* | 2/2009 | Silverstein et al. | 705/26.8 |
| 7,551,913 B1* | 6/2009 | Chien | 455/411 |
| 7,584,216 B2* | 9/2009 | Travieso et al. | 1/1 |
| 7,721,315 B2* | 5/2010 | Brown et al. | 725/109 |
| 2002/0035560 A1* | 3/2002 | Sone | 707/5 |
| 2002/0087973 A1* | 7/2002 | Hamilton et al. | 725/32 |
| 2002/0138560 A1 | 9/2002 | Aaltonen et al. | |
| 2002/0147645 A1* | 10/2002 | Alao et al. | 705/14 |
| 2002/0147926 A1* | 10/2002 | Pecen et al. | 713/201 |
| 2003/0083977 A1 | 5/2003 | Syed | |
| 2003/0212996 A1* | 11/2003 | Wolzien | 725/60 |
| 2004/0064351 A1* | 4/2004 | Mikurak | 705/7 |
| 2004/0107169 A1* | 6/2004 | Lowe | 705/59 |
| 2004/0107436 A1* | 6/2004 | Ishizaki | 725/36 |
| 2004/0152446 A1* | 8/2004 | Saunders et al. | 455/411 |
| 2004/0167784 A1* | 8/2004 | Travieso et al. | 704/270.1 |
| 2004/0181666 A1* | 9/2004 | Candelore | 713/160 |
| 2004/0204997 A1* | 10/2004 | Blaser et al. | 705/14 |
| 2004/0234234 A1 | 11/2004 | Loytana et al. | |
| 2005/0021713 A1* | 1/2005 | Dugan et al. | 709/223 |
| 2005/0022210 A1* | 1/2005 | Zintel et al. | 719/318 |
| 2005/0060417 A1* | 3/2005 | Rose | 709/228 |
| 2005/0130645 A1* | 6/2005 | Albert Dobson et al. | 455/423 |
| 2005/0166264 A1* | 7/2005 | Yamada et al. | 726/21 |
| 2005/0185918 A1* | 8/2005 | Lowe | 386/46 |
| 2005/0215233 A1* | 9/2005 | Perera et al. | 455/411 |
| 2005/0228754 A1* | 10/2005 | Pezzaniti et al. | 705/64 |
| 2006/0056615 A1* | 3/2006 | Rao | 379/229 |
| 2006/0084435 A1* | 4/2006 | Borsos et al. | 455/436 |
| 2006/0112180 A1* | 5/2006 | Vedula | 709/227 |
| 2006/0121935 A1* | 6/2006 | Dalsgaard et al. | 455/552.1 |
| 2006/0123053 A1* | 6/2006 | Scannell, Jr. | 707/104.1 |
| 2006/0136556 A1* | 6/2006 | Stevens et al. | 709/203 |
| 2006/0160546 A1* | 7/2006 | Tang et al. | 455/461 |
| 2007/0005777 A1* | 1/2007 | Fremantle et al. | 709/228 |
| 2007/0050711 A1* | 3/2007 | Walker et al. | 715/530 |
| 2007/0168534 A1* | 7/2007 | Hiltunen et al. | 709/230 |
| 2008/0295140 A1* | 11/2008 | Praden | 725/93 |
| 2009/0268648 A1* | 10/2009 | Tardy et al. | 370/310 |
| 2013/0166595 A1* | 6/2013 | Meketa et al. | 707/783 |

OTHER PUBLICATIONS

European Search Report.
Exert (1 page) of European Patent Office Communication issued on May 11, 2011 in corresponding European Patent Application No. 05 821 697.9.

* cited by examiner

SERVICE PERSONALIZATION IN A TERMINAL DEVICE

The present invention relates to service personalization in user terminal devices.

More particularly, it relates to a service personalization system whose common service signals for a large number of users go from a service server to the terminal devices via a broadcasting network, and in which system the server can communicate interactively with the terminal devices through a point-to-point network.

There exist various ways of distributing information or personalized services to a terminal device of a user: either via a point-to-point network, or via a broadcasting network.

The point-to-point network, to which the invention also applies, can be an interactive-type network in which a user terminal transmits a request concerning services via a channel of the network to a service server which responds by delivering service signals to it via the same channel. The point-to-point network offers the advantage of delivering on-demand services with an acknowledgment mechanism guaranteeing that a selected service signal is received properly by the destination device. The most well-known applications that use this type of network are, for example, radio-communications networks and the Internet.

Personalizing a service delivered by a point-to-point network is known. For example, a personalized portal is implemented in a service provider server and it proposes to a user to create his or her own Internet page by bringing together links to a plurality of other Internet sites. The terminal device of the user connects up to the server via the point-to-point network and creates a user profile, e.g. by the user's identity and centers of interest being input, which identity and centers of interest are then transmitted to the server in secure manner. An identifier (login/password) is allocated to the user in order to identify said user during subsequent connections to the server. Thus, the user has an account with the service provider and chooses display modules proposed by the server that the user wishes to incorporate, and chooses the layout of said display modules on the page. The portal is personalized on the server of the service provider and is transmitted to the user via the point-to-point network. The high cost of the service personalization that goes via the point-to-point network is due to the repetitive transmission of a large number of items of data for each user of the network. In addition, access to the information via the point-to-point network suffers from slowness and lack of availability caused by a network passband that is insufficient whenever a very large number of user devices are connected to the network at the same time.

The broadcasting network to which the invention also applies can be a unidirectional network that transmits service signals to all of the user devices that are connected to the network, certain services being accessible only by means of right of use. The services are thus transmitted in synchronized manner to those users who are authorized to access such services, without any acknowledgement mechanism, from a server. The broadcasting network offers the advantage of addressing numerous users. The most well-known applications are television signal broadcasting and/or radio-broadcasting of the Digital Video Broadcasting (DVB) type, of the Digital Multimedia Broadcasting (DMB) type, of the Digital Terrestrial Television (DTT or DTTV) type, of the Terrestrial Integrated Services Digital Broadcasting (ISDB-T) type, or of the Mobile Broadcast/Multicast Service (MBMS), etc. In another example, a Wireless Local Area Network (WLAN) can be used as a point-to-point network (WiFi) and/or as a broadcasting network (WiMAX).

It is also known that there exists a service personalization system that is proposed by service providers and whose services go via the broadcasting network from a service server to a user terminal. In such a system, the service signals broadcast are accompanied by information associated with the services, such information being necessary to each terminal device in order to identify and filter the service signals from the broadcast flow as a function of a user profile including, in particular, user parameters such as the user's identity and centers of interest. Those parameters are stored in a smart card inserted in a reader in the terminal. Information relating to the interest of the user for each broadcast service is determined in the smart card as a function of the broadcast information associated with the service signals and of the user parameters stored in the card. Thus, the terminals transmit determined information to the service server through a point-to-point network so as to select broadcast service signals depending on the centers of interest of the users. The service personalization is based only on filtering the content of the broadcast service signals. Since the broadcasting network does not transmit on-demand services, it suffers from the drawback of broadcasting only the most commonly used services. A user having a centre of interest that is not very common, such as water skiing, cannot access information relating to that centre of interest so long as such information is not broadcast over the network.

In another known service personalization system, the terminal device of a user estimates the preferences of the user without action from said user, by learning as a function of the broadcast signals that are selected by the user. The terminal device filters the broadcast service signals that are of interest for the user. That personalization system is still based on filtering broadcast service signal content, and it requires broadcasting of many service signals in order to satisfy a large portion of the users without however giving them access to service signals relating to uncommon centers of interest.

There thus exists a need to have a service personalization system that is inexpensive but that proposes to any user access to any service depending on his or her centre(s) of interest.

An object of the invention is to remedy the above-mentioned drawbacks by personalizing service signals coming from a service server, directly in a user terminal device, and by using both a service signal broadcasting network and also a point-to-point network.

In order to achieve this object, a method of performing service personalization in a terminal device receiving service signals broadcast through a first network from a server and respectively including service data and service identifiers, the service signals being filtered by comparing the service identifiers with an identifier stored in the terminal into a service signal identified by the stored identifier, is characterized in that it comprises the following steps:

extracting common data accessible to a plurality of terminal devices and a parameter type from the identified service signal;

reading a parameter stored in the device and relating to the parameter type;

determining a final address by applying the read parameter to an algorithm; and transmitting a request including the final address through a second network to the server which transmits a first personalized file associated with the final address and including personalized data, in order to record and/or display the common data and the personalized data.

Although the algorithm can be pre-recorded and common to the service signals, it can be extracted from the identified service signal, or pre-recorded in the device and designated by an identifier included in the identified service signal.

Thus, in accordance with the invention, the services in the terminal device are personalized directly in the terminal device, by means of the personalized data dependent on the read parameter included in the profile of the user of the terminal device and transmitted by the server, it being possible for the personalized data to relate to an uncommon center of interest of the user.

The common data of a service is transmitted through the "broadcasting" first network, and the personalized data of said service is transmitted through the "point-to-point" second network. The invention is thus advantageous by reducing the interactivity and thus the number of request-response exchanges through the point-to-point network, thereby reducing the load thereon and therefore the transmission cost.

According to a characteristic of the invention, after receiving the first personalized file which is transmitted with a second parameter type, the method may further comprise the following steps in the terminal device:

reading a second parameter stored in the device and relating to the second parameter type;

determining a second final address by applying the second read parameter to an algorithm; and transmitting a second request including the second final address through the second network to the server which transmits second personalized data associated with the first personalized file through the second network to the terminal device.

According to another characteristic of the invention, the method may further comprise filtering broadcast service signals by comparing the service indicators with a second identifier extracted from the first personalized file in the terminal device in order to extract common data from a service signal identified by the second identifier.

According to yet another characteristic of the invention, the method may further comprise, after receiving the first personalized file, transmitting a request including a second final address extracted from the first personalized file through the second network to the server, said server transmitting to the terminal device a second personalized file associated with the second final address and including second personalized data.

The invention also provides a personalization system comprising a terminal device and a server broadcasting service signals respectively including service data and service identifiers to the terminal device through a first network, the service signals being filtered by comparing the service identifiers with an identifier stored in the terminal into a service signal identified by the stored identifier. The terminal device comprises:

means for storing the identifier and parameters associate with parameter types;

means for extracting common data accessible to a plurality of terminal devices and a parameter type from the identified service signal;

means for reading at least one stored parameter relating to the parameter type;

means for determining a final address by applying the read parameter to an algorithm; and means for transmitting a request including the final address through a second network to the server, the server transmitting personalized data in response to the final address to the terminal device.

In another embodiment of the terminal device, it comprises a terminal and a portable recording medium having a microcontroller, e.g. a smart card, in communication with the terminal. The terminal includes a first network interface connected to the first network for receiving the broadcast service signals and a second network interface connected to the second network. The recording medium includes the storage means that further store the extracted parameter type, the read means, the determination means, and the means for transmitting a request through the second network interface, so as immediately or subsequently, in the terminal, to cause the means for displaying the common data and the personalized data to perform such display.

Finally, the invention provides a computer program suitable for being implemented in a terminal device, said program comprising code instructions which, when the program is loaded and executed on said server, perform the steps of the method of the invention.

Other characteristics and advantages of the present invention appear more clearly on reading the following description of preferred embodiments of the invention, given by way of non-limiting example, and with reference to the corresponding accompanying drawings, in which:

FIG. 1 is a block diagram of a first embodiment of a service personalization system of the invention;

FIG. 2 diagrammatically shows an example of service data to be personalized;

The personalized services constructed by the invention are of any type.

For example, the homepage at an Internet site of a service provider or of a firm is personalized for each user having an account with the service provider or with the firm. The homepage comprises both content that is common to all of the users of the Internet site, including, in particular, the date and general information about goods and/or services offered by the service provider or by the firm, and also content that is personalized for each user, including, in particular the name of the user and information or links to information relating to specificities of the user, such as, for example, the user's centers of interest, age, sex, habits, etc.

Another example is a digital television network through which the user chooses a television program by means of an electronic program guide whose main page displayed on the television screen of the user proposes common television programs such as the news, and the weather, and television programs selected on the basis of the user's centers of interest, and that are not very frequently requested by other users, such as a program on a specific sport.

In another example, the broadcasting network is a cellular radio-communications network for mobile phones of the MBMS type or of the Handheld DVB (DVB-H) type.

Figure 1:
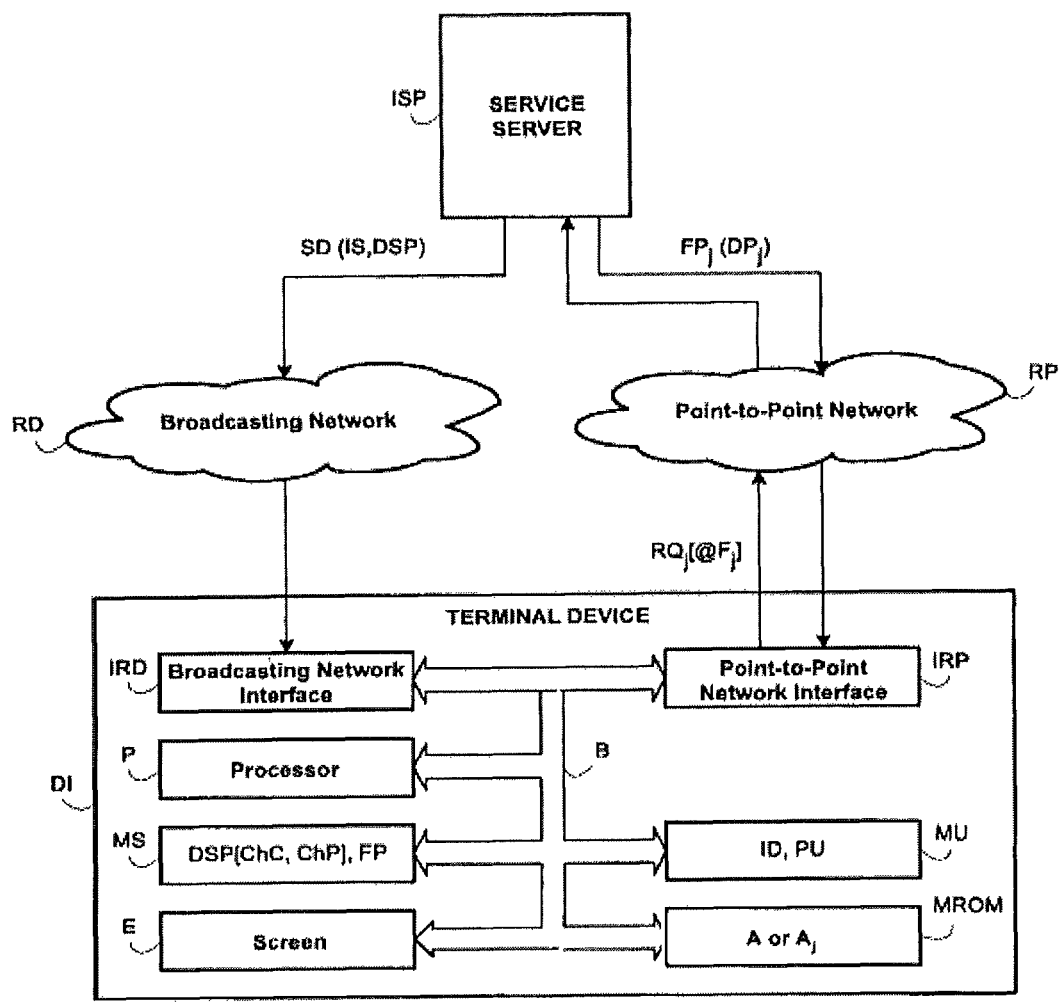

With reference to FIG. 1, a service personalization system of the invention comprises a service provider's service server ISP communicating with a plurality of communicating user terminal devices, only one of which (DI) is shown in FIG. 1, through a broadcasting network RD and through a point-to-point network RP.

For example, when the communicating user terminal device DI includes the functionalities of an intelligent television receiver, the broadcasting network RD is, for example, a cable and/or satellite television distribution network or a digital terrestrial television or "terrestrial DVB" (DVB-T) network broadcasting television program services. For example, the point-to-point network RP comprises an access network such as a Public Switched Telephone Network (PSTN) or a cellular radio-communications network of the Global System for Mobile Communications (GSM) type or of the Universal Mobile Telecommunications System (UMTS) type, and the Internet or a private network.

The server ISP transmits broadcast service signals SD, e.g. in the form of packets or messages, including service data DSP and service information IS characterizing and identifying a service broadcast through the broadcasting network RD to the device DI. For example, the broadcast service signals are of the MPEG2 (Motion Picture Experts Group—2) type, and the service information IS is of the Service Information/Program Specific Information (SI/PSI) type. The information IS indicates, for example, the theme and/or the type and/or a title or summary of the service developed in the content of the data, such as a particular sport, the local weather, an historic documentary, entertainment in a particular region, etc. The broadcast service signals SD with their service information IS are accessible by any device DI connected to the broadcasting network RD. Said broadcast service signals are filtered by the device DI as a function of the associated information IS that they contain and of user parameters PU relating to the user of the device DI and defining a user profile comprising the identity of the user and centers of interest and preferences of the user, so as to select and record service data to be personalized DSP and so as to designate associated personalization files FdP. The server ISP transmits at least one personalized file FP as a function of the user's parameters PU to the device DI through the point-to-point network RP in response to a request RQ including a final address @F and transmitted by the device DI.

In the first embodiment of the invention, the user terminal device DI comprises a processor P, a broadcasting network interface IRD for receiving the broadcast service signals SD and the associated service information IS from the server ISP through the network RD, a point-to-point network interface IRP for transmitting requests RQ to the server ISP and for receiving personalized files FP from the server through the network RP, a non-volatile memory MROM of the Mask Read-Only Memory (MROM) type, of the Flash type, or of the Static Random Access Memory (SRAM) type for an operating system and programs specific to the invention, a memory MU including the user parameters PU associated with parameter types and defining the profile of the user, a memory MS for storing, in particular, common data DC that is accessible to a plurality of terminal devices and personalized data included respectively in the personalized service signals and the received personalized files, and a display E, such as a screen, for displaying said common data combined with the personalized data. The display. E can be external to the device and connected thereto by a specific interface.

Figure 2:
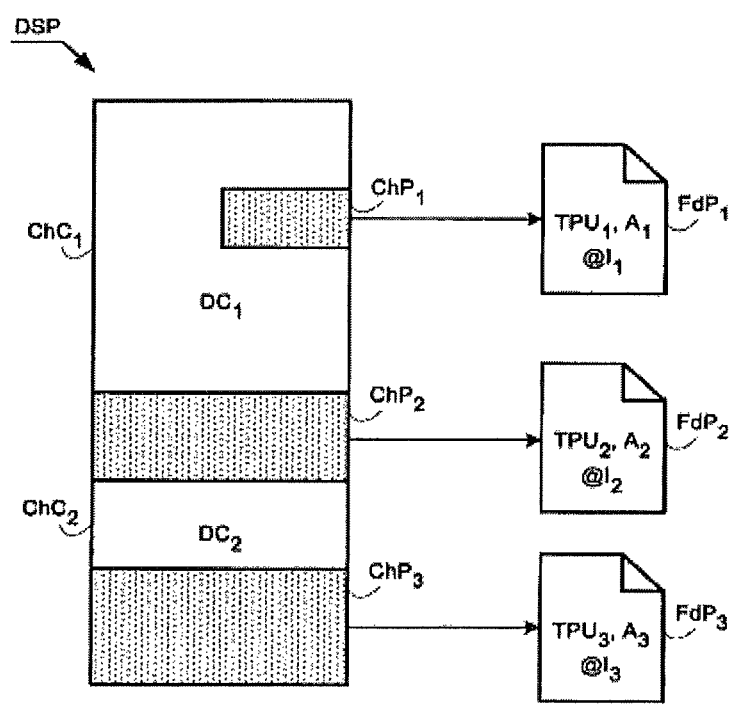

FIG. 2 shows an example of service data to be personalized DSP represented in the form of a Webpage or of a plurality of Webpages and of personalization files $FdP_1$, $FdP_2$ and $FdP_3$ received after filtering the broadcast service signals SD. The data DSP comprises common fields $ChC_1$ and $ChC_2$ that include common data $DC_1$ and $DC_2$ accessible to a plurality of terminal devices, and personalized fields $ChP_1$, $ChP_2$, $ChP_3$ that include hyperlinks calling up respective ones of the personalization files $FdP_1$, $FdP_2$ and $FdP_3$. Each personalization file $FdP_1$, $FdP_2$, $FdP_3$ comprises a list including one or more parameter types $TPU_1$, $TPU_2$, $TPU_3$, and can further comprise an initial address @I1, @I2, @I3 and/or a call to a determination program $A_1$, $A_2$, $A_3$ for determining a final address and executed by the processor P of the device DI, or indeed the address determination program itself to be loaded in the device DI after verification of its integrity. Each parameter type TPU indicates the parameter PU to be searched for in the memory MU of the device DI such as the user's name, address, age, favorite sports, etc. An initial address @I forms an address "base" such as "http://TV/" helping to determine a final address @F as a function of the parameters PU found in the memory MU. The final address @F in a request RQ makes it possible to determine the storage addresses of personalized files FP in the server ISP, said files FP each corresponding to a respective personalized field ChP of the data to be personalized DSP. In order to obtain said personalized files, the device DI transmits a request RQ including the final address @F to the server ISP through the point-to-point network.

In the example of a personalized service such as an electronic program guide, a guide presentation page includes common data such as the date, an advertising message, and international news. The data to personalized of the guide relates, for example, to the name of the user and to local news related to the address of the user and to any sporting events preferred by the user.

Figure 3:
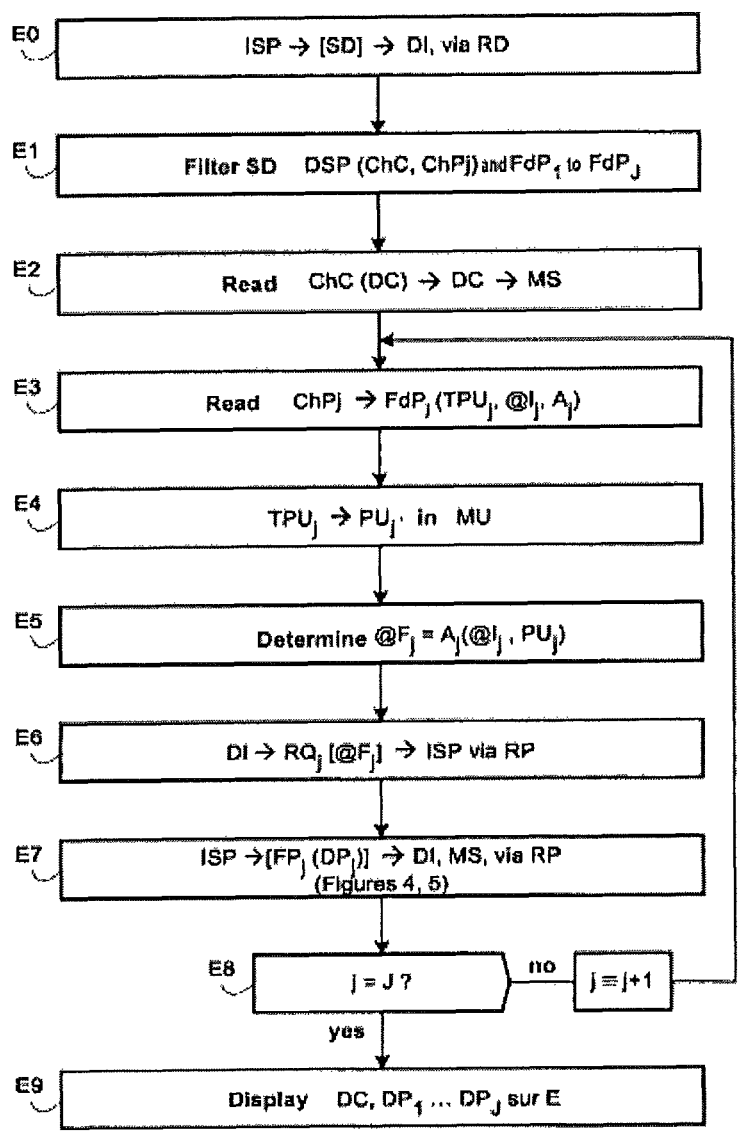
FIG. 3 is an algorithm of a service personalization method of the invention.

The service personalization method shown in FIG. 3 is executed by the processor P of the device DI, and comprises steps E0 to E9.

Step E0 consists in the broadcasting network interface IRD of the device DI receiving service signals SD including service information IS and broadcast by the server ISP through the broadcasting network RD.

In step E1, the processor filters the service signal SD so as to select service data to be personalized DSP associated with J personalization files $FdP_1$ to $FdP_J$ as described above. The broadcast service signals SD are filtered by comparing service identifiers included in the service information IS of the services with a broadcasting identifier ID stored in the memory MU so as to extract service data to be personalized DSP from the service signal identified in this way and so as to record it in the memory MS. The identifier ID relating to this service signal can be a parameter PU, or an item of data relating to a service use right, or an item of data resulting from selection by the user, e.g. a request for viewing an electronic program guide on the display of the device DI. The broadcasting identifier ID more generally includes a broadcasting network identifier and an identifier of the service signal broadcast by said broadcasting network, thereby enabling the device DI to select equally well service signals that are broadcast by a plurality of broadcasting networks. Then the processor P processes the recorded service data to be personalized DSP.

In step E2, the processor P reads each common field ChC of the service data to be personalized DPS and writes, one-by-one, the items of common data DC read from the common fields ChC in the memory MS. In this example, the data DSP also includes J personalized fields ChP. For each personalized field $ChP_j$, where j is an integer lying in the range 1 to J, the processor P executes a loop from step E3 to step E8 of the method as shown in FIG. 3.

In step E3, the processor extracts from the field $ChP_j$ a call link pointing to the associated and received personalization file $FdP_j$. In step E4, the processor reads the parameter types $TPU_j$ from the pointed-to file $FdP_j$ and reads the parameters $PU_j$ relating to the parameter types $TPU_j$ from the memory MU. In step E5, the processor extracts the initial address $@I_j$ from the personalization file $FdP_j$ and determines a final address $@F_j$ resulting from the extracted initial address $@I_j$ and the read parameters $PU_j$ being applied to a respective algorithm $A_j$ that can be pre-recorded in the memory MROM of the device DI, or that can be extracted from the file $FdP_j$ and loaded in the device DI, or that can be pre-recoded in the device DI and designated by an identifier included in the file FdP$_j$. In a variant, the algorithm A$_j$ is an algorithm pre-recorded in the device and executed regardless of the broadcast service signal.

Then, in step E6, the processor establishes a request RQ$_j$ including the final address @F$_j$ which is associated with a personalized file FP$_j$, and which is transmitted by the point-to-point network interface IRP from the device DI to the server ISP through a channel of the point-to-point network RP. The file FP$_j$ is addressed in a database of the server ISP as a function of the final address @F$_j$ and includes personalized data DP$_j$. In response to the request RQ$_j$, the server ISP transmits the personalized file FP$_j$ to the device DI via the same transmission channel constituted by the point-to-point network RP. The processor P of the device DI receives the file FP$_j$ in step E7 via the point-to-point network interface IRP of the device DI, and stores the personalized data DP$_j$ of the file FP$_j$ in the memory MS.

In step E8, if not all of the personalized fields ChP$_1$ to ChP$_J$ in the data DSP have been read, the processor executes a j+1$^{th}$ loop by reading, in step E3, the j+1$^{th}$ personalized field ChP$_{j+1}$. Once all of the fields ChP$_1$ to ChP$_J$ have been read and processed, the processor causes the common data DC and the personalized data DP$_1$ to DP$_J$ extracted from the received files FP$_1$ to FP$_J$ and stored in the memory MS to be displayed on the display E of the device DI in step E9. The data DC and DP$_1$ to DP$_J$ is displayed in one or more pages at locations defined in the respective fields ChC and ChP$_1$ to CHP$_J$ of the service data DSP personalized in this way.

In a variant, in step E9, the common data and the personalized data is stored so as to display it subsequently either on the screen E of the device DI, or in another device of the user via a removable recording medium.

At the request of the user, the processor can subsequently search the common data DC and the personalized data DP without necessarily accessing the server ISP via one of the two networks RD and RP, by means of the memory MS which has recorded said data. The advantage of this is firstly that the selected service data can be viewed without any connection to the two networks being necessary, and secondly that the access time for accessing the personalized data DP is reduced.

Steps E0 to E8 can be executed as background tasks without any action being required of the user.

Figure 4:
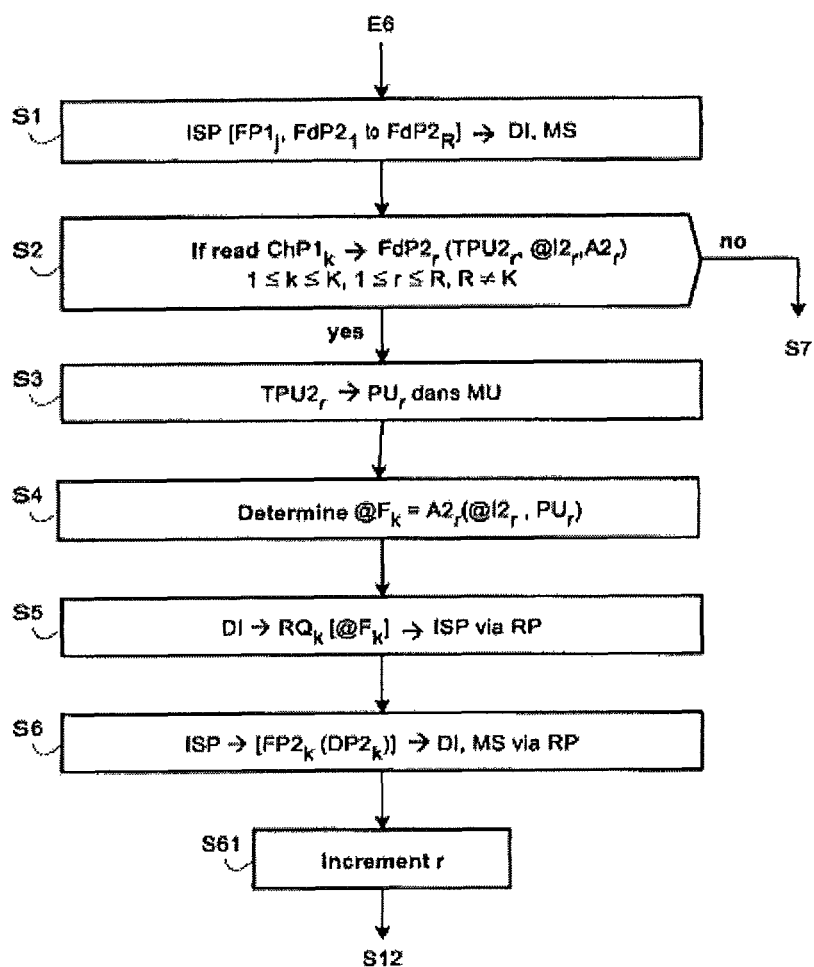
FIGS. 4 and 5 are sub-algorithms of the service personalization method of the invention.
Figure 5:
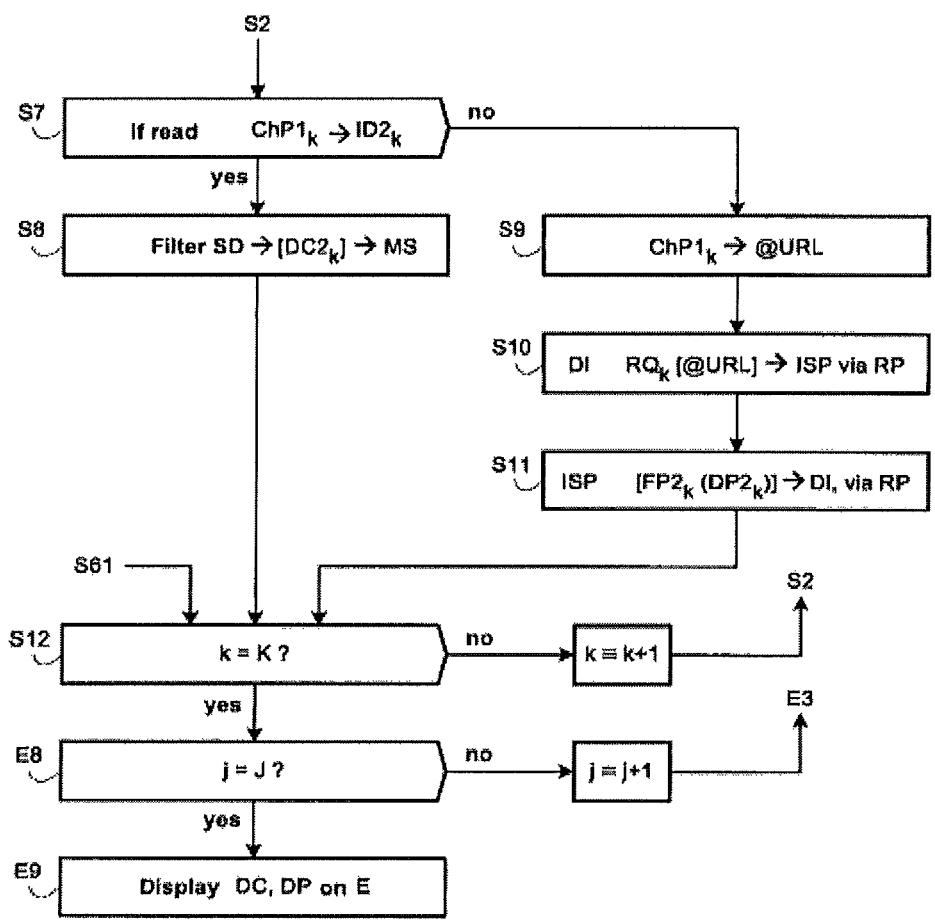

FIGS. 4 and 5 show sub-steps S1 to S12 relating to executing the step E7 when the personalized file FP$_j$, referred to below as the "first" personalized file FP1$_j$, received by the device DI through the network RP, comprises first personalized data DP1$_j$ and K personalizable fields ChP1$_1$ to ChP1$_K$. In which case, in response to the request RQ$_j$, the device DI receives, in the sub-step S1, the file FP1$_j$ and R personalization files FdP2$_1$ to FdP2$_R$, the number R of personalization files FdP2 being different from or possibly equal to the number K of personalized fields included in the file FP1$_j$. In sub-step S1, the processor P stores the various items of personalized data DP1$_j$ in the memory MS. As a function of the data in each field ChP1$_k$ read from the file FP1$_j$, where k is an integer lying in the range 1 to K, the processor executes the sub-steps S2 to S6, or the sub-steps S7 and S8, or the sub-steps S9 to S11.

In sub-step S2, the processor P verifies whether the field ChP1$_k$ contains a call link pointing to a received personalization file FdP2$_r$ associated with the field ChP1$_k$, where r is an integer lying in the range 1 to R. The processor P executes the sub-steps S3 to S6 which are identical to the above-described steps E4 to E7, as shown in FIG. 4. In sub-step S3, the processor reads the parameter types TPU2$_r$ from the pointed-to file FdP2$_r$ associated with the field ChP1$_k$ and reads the parameter PU$_r$ relating to the parameter types TPU2$_r$ from the memory MU. In sub-step S4, the processor extracts the initial address @I2$_r$ from the personalization file FdP2$_r$ and the respective algorithm A2$_r$ or an identifier thereof, and determines a final address @F$_k$ resulting from the extracted initial address @I2$_r$ and the read parameters PU$_r$ being applied to an algorithm A2$_r$. Then, in sub-step S5, the processor establishes a second request RQ$_k$ including the final address @F$_k$ which is associated with a second personalized file FP2$_k$ including second personalized data DP2$_k$. The point-to-point network interface IRP of the device DI transmits the second request RQ$_k$ to the server ISP through the point-to-point network RP. In response to the second request RQ$_k$, the server ISP transmits the personalized file FP2$_k$ associated with the address @F$_k$ to the device DI through the point-to-point network RP. The processor P of the device DI receives the file FP2$_k$ in the sub-step S6 via the point-to-point network interface IRP of the device DI and stores the second personalized data DP2$_k$ of the file FP2$_k$ in the memory MS.

Another field ChP1 of the file FP1$_j$ can also include a call link for pointing to a second personalization file FdP2$_1$ to FdP2$_R$ by incrementing S61 the index r. Similarly, as indicated in the sub-step S12, if the file FP2$_k$ also includes personalized data, the processor P executes the sub-steps S2 to S12 iteratively.

If, in sub-step S2, the field ChP1$_k$ does not contain any call link relating to a personalization file FdP$_2$, the processor goes to sub-step S7. If the field ChP1$_k$ contains a second broadcasting identifier ID2$_k$ distinct from the first identifier ID present in step E1 and relating to a service signal broadcast by the server ISP through the broadcasting network RD, the processor P filters the broadcast service signals SD received by the broadcasting network interface IRD of the device DI so as to record second common data DC2$_k$ relating to the second broadcasting identifier ID2$_k$ in the memory MS, in the sub-step S8. The processor then executes the sub-step S12. Using the example of the electronic program guide, the second broadcasting identifier is an indicator of a national football match that interests a large number of users and that is then broadcast through the broadcast network RD.

If, in sub-step S7, the field CH1P$_k$ does not contain any second broadcasting identifier ID2$_k$, the processor executes the sub-step S9 for extracting a final address @URL included in the field CH1P$_k$. Using the example of the electronic program guide, the address @URL is a link to a video clip showing a sport not broadcast by the broadcasting network RD but accessible by the point-to-point network RP, because it is of interest to a minority of users. In sub-step S10, the processor establishes and transmits a request RQ$_k$ via the point-to-point network interface IRP from the device DI to the server ISP through the point-to-point network RP. The request RQ$_k$ includes the address @URL that is associated with a second personalized file FP2$_k$ including second personalized data DP2$_k$ and stored in the database of the server ISP. In response to said request RQ$_k$, the server ISP transmits the personalized file FP2$_k$ to the device DI through the point-to-point network RP. The processor P of the device DI receives the file FP2$_k$ in sub-step S11 via the point-to-point network interface IRP of the device DI and stores the second personalized data DP2$_k$ of the file FP2$_k$ in the memory MS. With reference to the preceding example, the personalized data DP2$_k$ is constituted by the video clip.

In sub-step S12, the processor P verifies that all of the personalized fields CH1P$_1$ to CH1P$_K$ of the file FP1$_j$ have been read. Otherwise, the processor executes a k+1$^{th}$ loop S2 to S12 by reading, in step S2, a k+1$^{th}$ personalized field CH1P$_{k+1}$. Once all of the fields CH1P$_1$ to CH1P$_K$ of the file FP1$_j$ have been read and processed, the processor executes the steps E8 and E9 as described with reference to FIG. 3.

Figure 6:
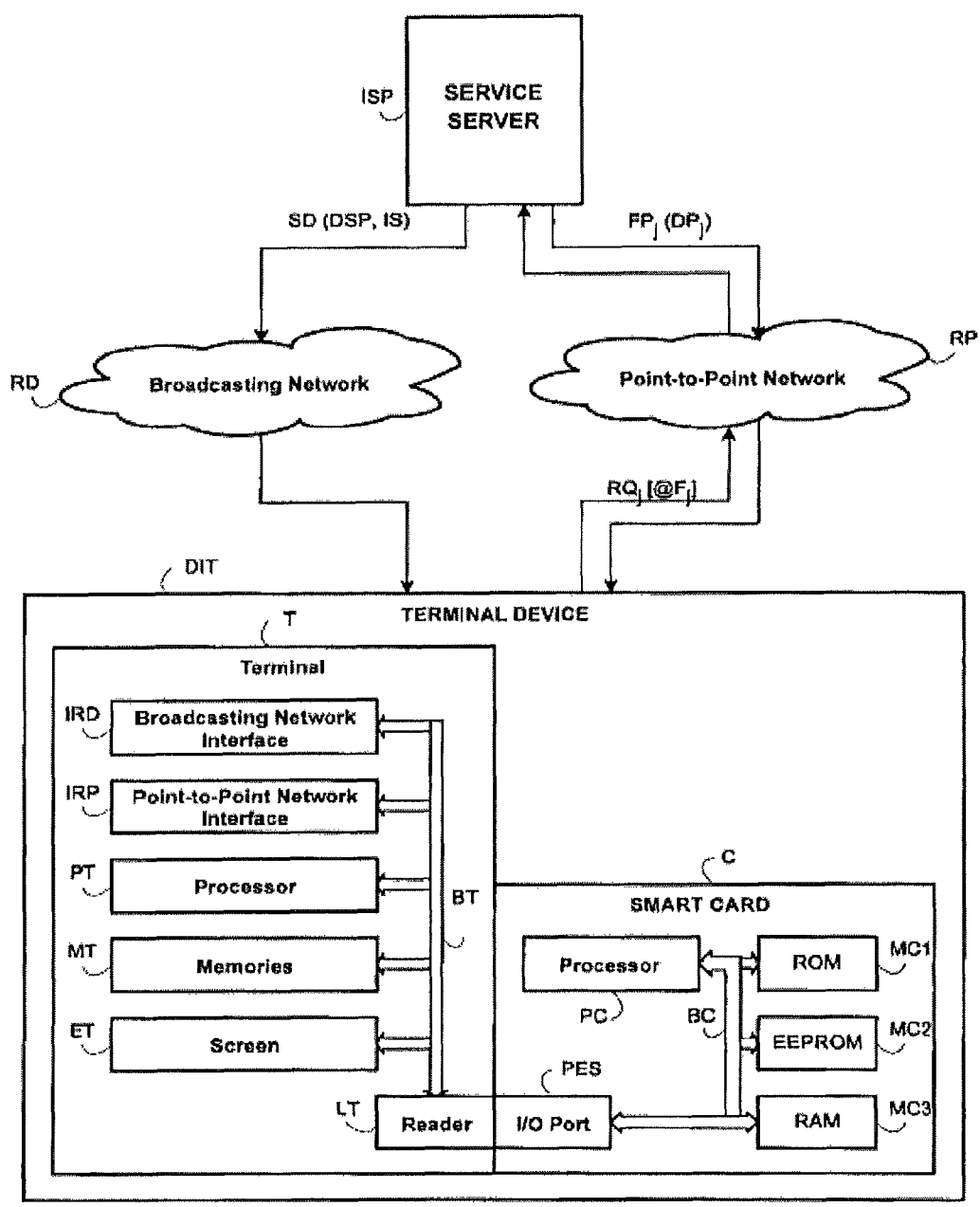
FIG. 6 is a block diagram of a second embodiment of the service personalization system.

In a second embodiment of the user terminal device DIT shown in FIG. 6, the device DIT comprises a terminal T receiving a removable smart card C that is also referred to as a "microcontroller card" or as an "integrated circuit card", and that either has contacts or is contactless. In a first example, the terminal is a mobile radio terminal for which the smart card is of the Universal Integrated Circuit Card (UICC) type. The smart card is, for example, a Subscriber Identity Module (SIM) card for a cellular radio-communications network of the GSM type, or it is a Universal SIM (USIM) card for a Code Division Multiple Access (CDMA) network of the third generation (3GPP—3$^{rd}$ Generation Partnership Project) of the UMTS type. In other examples, the terminal is a banking terminal receiving a credit card, or a Personal Computer (PC) provided with a smart card reader, or indeed a small item of communicating equipment such as a Personal Digital Assistant (PDA) provided with a smart card reader. In other examples, the card can be a Universal Serial Bus (USB) key, a Flash-Memory Card such as a Secure Digital Card, a Multi-Media Card, or indeed be replaced with any removable recording medium having a microcontroller.

The terminal T includes a processor PT, memories MT, a screen ET, and a smart card reader LT. The terminal T also includes the broadcasting network interface IRD of the device DIT for receiving the service signals SD with the service information IS broadcast by the server ISP through the network RD, and the point-to-point network interface IRD of the device DIT for transmitting requests RQ to the server ISP and for receiving personalized files FP from the server through the network RP. The various elements of the terminal are interconnected via a bidirectional bus BT.

As is known, the smart card C mainly comprises a processor PC, three memories MC1 to MC3 and an input/output port PES that is connectable to the reader LT for exchanging commands and responses with the terminal T. The various elements of the card are interconnected by a bidirectional bus BC. The memory MC1 is of the ROM type or of the Flash type, and it includes the operating system of the card. The memory MC2 is a non-volatile memory e.g. an Electrically Erasable Programmable Read-Only Memory (EEPROM) or a Flash memory, in particular for storing keys, identity numbers and other characteristics of the profile of the user possessing the card, such as the user parameters PU associated with parameter types TPU and at least one service identifier IS. The memory MC3 is a RAM or SRAM serving more particularly for data processing.

In the second embodiment, the processor PC of the card C executes most of the steps of the service personalization method as described above with reference to the device DI. Two spaces in the memory MC2 of the card correspond respectively to the memories MU and MS of the first embodiment of the device DI shown in FIG. 1, and are dedicated to the characteristics of the profile of the user with the user parameters PU and to the service data DSP (DC, ChP) and personalized data DP transmitted by servers such as the server ISP. The data DSP, DC, and DP is received respectively by the interface IRD and by the interface IRP of the terminal and is transmitted to the card C via the reader LT of the terminal and via the port PES so that the processor PC processes said data. The requests RQ from the card are established by the processor PC and are transmitted via the port PES, via the reader LT, and via the interface IRP to the server ISP via the network RP. In the terminal, the processor PC controls a user interface comprising the screen ET so as to display the common data DC and the personalized data DP$_j$ in response to a personalized file FP$_j$.

In a third embodiment, the user terminal is analogous to the user terminal of the first embodiment, and it can include a terminal such as the terminal T described above. A removable memory card is inserted into the terminal device. The memory card includes a non-volatile memory connected to an input/output port PES connectable to a card reader LT. However, in the third embodiment, the processor of the terminal executes the service personalization method as described above, like the processor P in the first embodiment shown in FIG. 1. The non-volatile memory of the memory card replaces the memory MU of the device DI and stores at least one service identifier ID and parameters PU$_j$ associated with parameter types TPU$_j$. The memory MS of the device DI remains and it coincides with the memories MT of the terminal when said terminal is included in the device.

The invention described herein relates to a method and to a system for service personalization. In a preferred implementation, the steps of the method are determined by the instructions of a computer program suitable for being implemented in the terminal device DI, such as a computer, a digital television set, or a mobile terminal, or any other communicating intelligent terminal, connected both to a broadcasting network and to a point-to-point network, or indeed suitable for being implemented in a portable recording medium having a microcontroller, such as a smart card, in communication with such a terminal device or with a terminal, the terminal device DI or the terminal T receiving service signals broadcast through a first network RD from a server and respectively including service data and service identifiers, the service signals being filtered by comparing the service identifiers with an identifier stored in the terminal into a service signal identified by the stored identifier. The program includes instructions which, when said program is loaded and executed in the terminal device or in the recording medium whose operation is then controlled by executing the program, perform the following steps of the method:

extracting common data accessible to a plurality of terminal devices or terminals and a parameter type from the identified service signal;

reading a parameter stored in the terminal device or in the recording medium and relating to the parameter type;

determining a final address by applying the read parameter to an algorithm A or A$_j$; and transmitting a request including the final address through a second network to the server which transmits a first personalized file associated with the final address and including personalized data to the terminal device or to the terminal.

The preceding transmission can be followed immediately or subsequently by display of the common data and of the personalized data in the terminal device, or by a command for causing such display to take place in the terminal.

The invention claimed is:

1. A method of performing service personalization in a broadcast network, comprising:

storing, in a terminal device, a broadcast identifier;

receiving, in the terminal device, service signals broadcast through a first broadcast network from a server and respectively including service data and service information, said service information providing a description of content of the service data and including service identifiers;

filtering the service signals in the terminal device by comparing the service identifiers, included in said received broadcast service signals, with the stored broadcast identifier to provide a service signal identified by the stored broadcast identifier;

extracting, by the terminal device, (i) common data accessible to a plurality of terminal devices and (ii) a parameter type from the service signal identified from the filtered service signals, said parameter type indicating a parameter to be searched for in the terminal device;

storing, in the terminal device, the extracted common data extracted from the identified service signal;

reading a parameter stored in the terminal device relating to the parameter type extracted from the identified service signal;

determining a final address by applying the parameter, read from the terminal device, to an algorithm, wherein said final address relates to a storage address of a first personalized file in the server;

transmitting, to the server, via a second point-to-point network, a request identifying the final address;

receiving, from the server, via the second point-to-point network, the first personalized file associated with the final address identified in the request, said first personalized file including first personalized data;

storing, in the terminal device, the received first personalized file;

transmitting, to the server, through the second network, a second request identifying a second final address extracted from the received first personalized file; and receiving, in the terminal device, from the server, a second personalized file associated with the second final address identified in the second request, said second personalized file including second personalized data.

2. A method according to claim 1, in which the algorithm is extracted from the identified service signal.

3. A method according to claim 1, in which the common data and at least the first personalized data is displayed in locations defined in a field including the common data and in a personalization field including the parameter type, said fields being read from the service signal identified by the stored identifier.

4. A method according to claim 1, wherein the first personalized file is transmitted with a second parameter type that indicates a second parameter to be searched for in the terminal device, said method further comprising the following steps in the terminal device:

reading a second parameter stored in the device and relating to the second parameter type; and determining the second final address by applying said second parameter to an algorithm.

5. A method according to claim 1, further comprising the steps of filtering broadcast service signals by comparing the service identifiers, included in said received broadcast service signals, with a second identifier extracted from the first personalized file in the terminal device, and extracting common data from a service signal identified by the second identifier.

6. A personalization system comprising:
a server, and
a terminal device configured to
receive service signals broadcast through a first broadcast network from the server, the service signals respectively including service data and service information, said service information providing a description of content of the service data and including service identifiers; and
filter the service signals being by comparing the service identifiers with a broadcast identifier stored in the terminal device to provide a service signal identified by the stored broadcast identifier, wherein the terminal device comprises
means for storing the broadcast identifier and parameters associated with parameter types;
means for extracting common data accessible to a plurality of terminal devices and a parameter type from the service signal identified from the filtered service signals, said parameter type indicating a parameter to be searched for in the terminal device;
means for reading at least one stored parameter relating to the parameter type extracted from the identified service signal;
means for determining a final address by applying said parameter to an algorithm, wherein said final address relates to a storage address of a first personalized file in the server;
means for transmitting a request identifying the final address through a second point-to-point network to the server;
means for receiving, through the second point-to-point network from the server, the first personalized file associated with the final address identified in the request, said first personalized file including first personalized data;
means for storing the received first personalized file;
means for transmitting, through the second network to the server, a second request including a second final address extracted from the first personalized file; and
means for receiving, from the server, a second personalized file associated with the second final address identified in the second request, said second personalized file including second personalized data.

7. A personalization system according to claim 6, in which the terminal device comprises a terminal and a portable recording medium having a microcontroller in communication with the terminal, wherein the terminal includes a first network interface connected to the first network for receiving the broadcast service signals and a second network interface connected to the second network, and wherein the recording medium includes storage means that store the extracted parameter type, the read means, the determination means, and the means for transmitting a request through the second network interface.

8. A computer system according to claim 6, in which the means for storing a service identifier and parameters associated with parameter types are included in a memory card.

9. A non-transitory computer readable storage medium storing a program that is executed in a terminal device, said program comprising program instructions which, when the program is loaded and executed in said terminal device, control said terminal device to perform the following steps:

storing, in the terminal device, a broadcast identifier;

receiving service signals broadcast through a first broadcast network from a server and respectively including service data and service information, said service information providing a description of content of the service data and including service identifiers;

filtering the service signals by comparing the service identifiers, included in said received broadcast service signals, with the stored broadcast identifier to provide a service signal identified by the stored broadcast identifier;

extracting (i) common data accessible to a plurality of terminal devices and (ii) a parameter type from the service signal identified from the filtered service signals, said parameter type indicating a parameter to be searched for in the terminal device;

reading a parameter stored in the terminal device relating to the parameter type extracted from the identified service signal;

determining a final address by applying said parameter to an algorithm, wherein said final address relates to a storage address of a first personalized file in the server;

transmitting a request identifying the final address through a second point-to-point network to the server;

receiving, from the server, via a second point-to-point network, the first personalized file associated with the final address identified in the request, said first personalized file including personalized data;

storing, in the terminal device, the received first personalized file;

transmitting, through the second network to the server, a second request identifying a second final address extracted from the received first personalized file; and receiving, from the server, a second personalized file associated with the second final address identified in the second request, said second personalized file including second personalized data.

10. A computer program implemented in a non-transitory portable recording medium having a microcontroller in communication with a terminal device, said program comprising program instructions which, when the program is loaded and executed, in said terminal device, control said terminal device to perform the following steps:

storing, in the terminal device, broadcast identifier;

receiving service signals broadcast through a first broadcast network from a server and respectively including service data and service information, said service information providing a description of content of the service data and including service identifiers;

filtering the service signals by comparing the service identifiers, included in said received broadcast service signal, with the stored broadcast identifier to provide a service signal identified by the stored broadcast identifier;

extracting (i) common data accessible to a plurality of terminal devices and a parameter type from the service signal identified from the filtered service signals, said parameter type indicating a parameter to be searched for in the terminal device;

reading a parameter stored in the recording medium relating to the parameter type extracted from the identified service signal;

determining a final address by applying said parameter to an algorithm, wherein said final address relates to a storage address of a first personalized file in the server;

transmitting a request identifying the final address through a second point-to-point network to the server;

receiving, from the server, via the second point-to-point network, the first personalized file associated with the final address identified in the request, said first personalized file including first personalized data;

storing, in the terminal device, the received first personalized file;

transmitting, through the second network to the server, a second request identifying a second final address extracted from the received first personalized file; and receiving, from the server, a second personalized file associated with the second final address identified in the second request, said second personalized file including second personalized data.

11. A method according to claim 1, in which the algorithm is pre-recorded in the device and designated by an identifier included in the identified service signal.

* * * * *